July 7, 1942.  L. W. LESSLER ET AL  2,289,133
CAMERA WITH FILTER
Filed Oct. 12, 1940

LEW W. LESSLER
BROR W. HENRIKSON
INVENTORS
BY
ATTORNEYS

Patented July 7, 1942

2,289,133

UNITED STATES PATENT OFFICE 2,289,133

CAMERA WITH FILTER

Lew W. Lessler, Binghamton, and Bror W. Henrikson, Port Dickinson, N. Y., assignors to General Aniline & Film Corporation, Binghamton, N. Y., a corporation of Delaware Application October 12, 1940, Serial No. 360,964

6 Claims. (Cl. 95—45)

The present invention involves a photographic camera and more particularly a camera provided with an automatic filter device.

It is well known in the photographic art that the use of suitable filters in connection with a camera lens enables the photographer to obtain improved and desirable results. For example, the use of a yellow filter results in a better rendition of cloud effects in the final image. In the prior art arrangements these filters have been sold as separate accessories which could be attached to the front of the camera lens. The necessity of placing these filters in position for use and of removing them after the desired exposures have been made, has been one disadvantage which has hindered their development.

With the disadvantages of the prior art in view, it is accordingly one object of this invention to provide a built-in filter in a photographic camera.

Another object is to provide such a built-in filter in a camera which can be focused both on relatively near and relatively distant objects.

A further object is to provide a built-in yellow filter which will be optically positioned in alignment with the camera lens when the lens is focused on relatively distant objects.

Still another object is to provide a yellow filter which will be automatically moved out of alignment with the camera lens when said lens is focused on relatively near objects.

Additional objects and advantages of this invention will be readily apparent from the following specification.

In the drawing which forms a part of this application and in which like reference characters indicate like parts:

Figure 1 is a front view of a photographic camera with a built-in filter according to the present invention;

Figure 3:
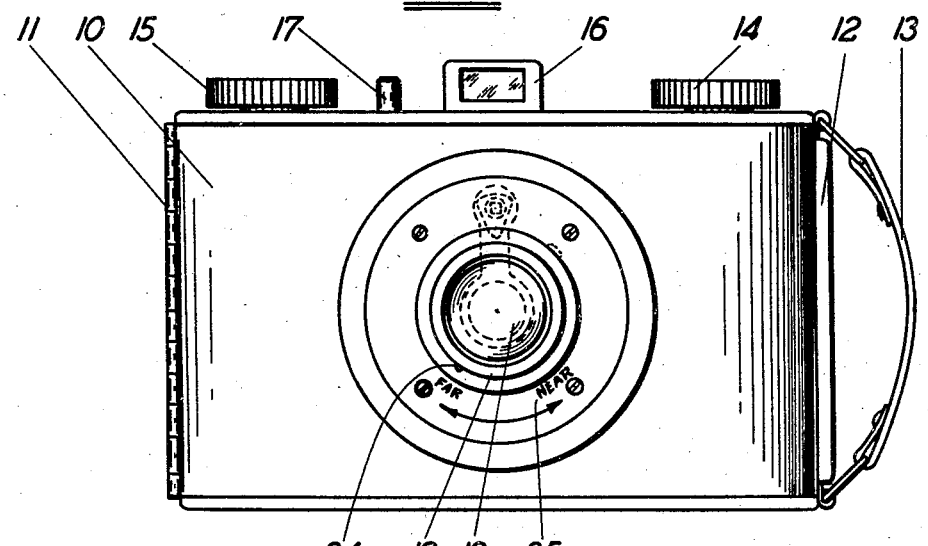
Figure 3 is a sectional view on the line 3—3 of Figure 2.

In order that those persons skilled in the art may fully understand the nature and scope of the present invention, we shall now give a detailed and concise description thereof, with particular reference to the above mentioned drawing. As shown in Figure 1, the camera 10 is provided with a suitable carrying handle 13. A camera back (not shown) is hinged to the camera body 10 at 11, and is provided with a suitable latch 12 for holding said back in position. Winding knobs 14 and 15 are mounted on the top of the camera for cooperation with the customary take-up and supply spools. The top of the camera also carries a view finder 16 and a shutter release button 17.

A suitable lens 18 is carried by a rotatable lens carrying member 19. This lens carrying member 19 is threaded at 20 for engagement with corresponding threads in a suitable bushing 21 mounted on the camera front 22. Because of this threaded engagement it is apparent that rotation of the lens 18 and lens carrying member 19 will result in movement of the lens along its optical axis. Thus, when the lens carrying member 19 is rotated in a counter-clockwise direction with reference to Figure 1, the lens will be moved outwardly toward the object to be photographed and will accordingly be focused for relatively close distances. Similarly, when the lens carrier is rotated in a clockwise direction, the lens will be screwed into the camera and will be focused on more distant objects.

In the particular camera shown in the drawing, the lens is adapted for movement between two focusing positions, in one of which the lens is focused on relatively distant objects and in the other of which said lens is focused on relatively nearby points. A suitable indicator 34 on the lens carrier 19 may cooperate with a scale 35 to indicate the particular position for which the lens has been focused.

On the interior of the camera front 22 and fastened to the inner end of lens carrying member 19 there is an annular flange or ring member 24. At one point on the outer periphery of this flange there is a lug 25, the purpose of which will be described below. Flange 24 and lug 25 are firmly connected to the lens carrying member and rotate as an integral part of said member.

A suitable filter 26 is carried by a pivoted filter arm 27. This arm 27 is connected to an axle 28 which is rotatably mounted on the inner partition 29 of the camera. This inner partition has an opening 36 which is co-axial with lens 18 and serves to limit the total amount of light passing from said lens to the interior of the camera.

Figure 2:
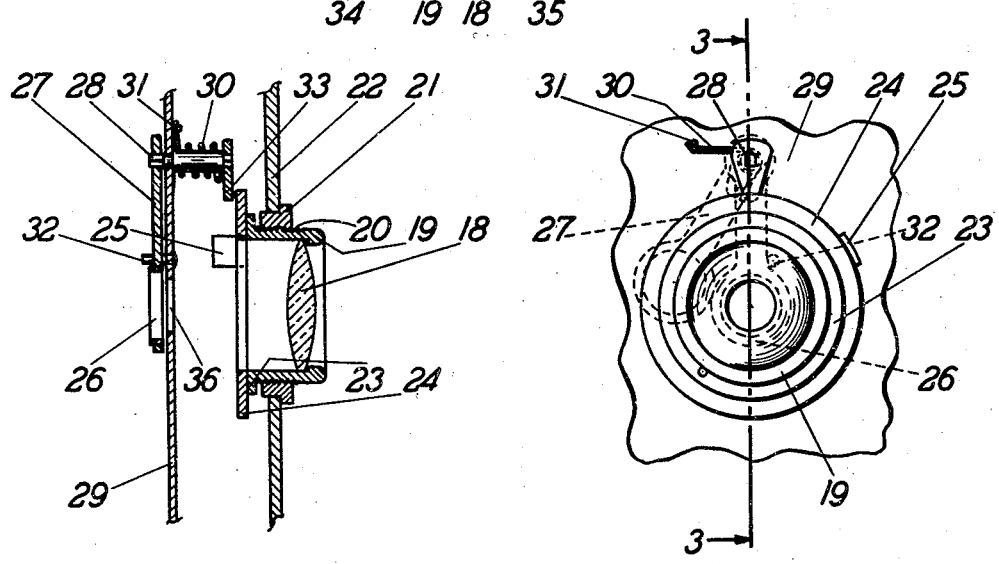
Figure 2 is an enlarged front view of the lens, lens carrying member, and filter attachment of the camera shown in Figure 1, with the front plate removed.

The filter arm 27 and axle 28 are pivoted above this opening 36 so that the filter 26 may be swung into or out of alignment with opening 36 and lens 18. The two limiting positions of said filter and filter arm are shown clearly in dotted outline in Figure 2.

Axle 28 carries a spring 30, one end of which is fastened to the partition 29 as at 31, and the other end of which is fastened to said axle. This spring is so arranged that it normally urges the filter arm toward the right in Figure 2 against a limiting pin or stop 32 on the partition 29. Thus, the filter is normally held in alignment with lens 18, while the lens itself is focused on relatively distant objects.

Axle 28 is further provided with a downwardly projecting arm 33 which is positioned just behind the flange 24 on lens carrying member 19. Arm 33 is accordingly in the path of lug 25 mentioned above. Thus, when the lens carrying member 19 is rotated in a counter-clockwise direction in the drawing from the "far" to the "near" position, lug 25 will engage the arm 33 and rotate the filter arm to the left hand position of Figure 2. In this position the filter is out of alignment with the lens 18. On the other hand, when the lens carrying member is turned in clockwise direction back to the "far" position, the lug 25 will disengage itself from arm 33 and will permit arm 33 and filter arm 27 to move the filter 26 back into alignment with lens 18 under the influence of spring 30.

It will thus be apparent that we have provided a built-in filter construction in which the filter will be automatically positioned in alignment with the camera lens when said lens is focused on relatively distant objects. The lens is used in this "far" position for outdoor scenes where cloud effects predominate. The filter may advantageously be a yellow filter which will facilitate the photographic reproduction of such cloud effects. On the other hand, when the camera is focused for nearby objects, as is the case in portrait or close-up work, the filter will automatically be moved out of alignment with the lens and will not affect the picture in any way. The same basic idea can obviously be applied to cameras having more than the two focusing positions herein described. In such a case the connections would also be adapted to leave the filter in position while the lens is focused on relatively distant objects and to hold the filter in inoperative position for photographing nearby objects.

Since the present invention can be used in many equivalent forms readily apparent to those skilled in the art, it is not my intention to limit it to the particular construction shown in the drawing. The drawing is to be interpreted as illustrative of the present invention and said invention is to be limited only by the scope and spirit of the attached claims.

Now therefore we claim:

1. A photographic camera having a body, a lens, a lens carrying member movable to different positions with respect to said body for focusing said lens on relatively near and relatively distant objects, a filter on said camera movable into and out of alignment with said lens, and means for automatically positioning said filter in alignment with said lens when the lens and lens carrying member are moved into focus for relatively distant objects.

2. A photographic camera having a body, a lens, a lens carrying member rotatable to different positions for moving said lens along its optical axis to different focusing positions with respect to said body for relatively near and relatively distant objects, a filter on said camera movable between two positions in one of which the filter is in alignment with said lens and in the other of which said filter is out of alignment with said lens, resilient means normally holding said filter in one of said positions, and means on said lens carrying member for moving said filter to the other of said positions as said lens carrying member and lens are moved to focusing position.

3. A photographic camera having a body, a lens, a lens carrying member rotatable to different positions for moving said lens along its optical axis to different focusing positions with respect to said body for relatively near and relatively distant objects, a filter on said camera movable into and out of alignment with said lens, resilient means normally holding said filter in its aligned position, and means on said lens carrying member for moving said filter out of alignment as said lens carrying member is rotated to focus the lens on relatively near objects.

4. A photographic camera having a body, a lens, a lens carrying member rotatable to different positions for moving said lens along its optical axis to different focusing positions with respect to said body for relatively near and relatively distant objects, a filter on said camera movable into and out of alignment with said lens, resilient means normally holding said filter in its aligned position, and a lug on said lens carrying member for engaging said filter and moving it out of alignment with said lens when said lens carrying member is rotated to focus the lens on relatively near objects.

5. A photographic camera having a body, a lens, a lens carrying member rotatable to different positions for moving said lens along its optical axis to different focusing positions with respect to said body for relatively near and relatively distant objects, an arm rotatable on said camera, a filter connected to said arm and movable into and out of alignment with said lens as said arm is rotated to a first and a second position respectively, resilient means normally holding said arm and filter in their first or aligned position, and means on said lens carrying member for engaging said arm and rotating said filter and filter arm into their second or unaligned position against the action of said resilient means as said lens carrying member is rotated to focus the lens on relatively near objects.

6. A photographic camera having a body, a lens, a lens carrying member movable to two different positions with respect to said body for focusing said lens on relatively near and relatively distant objects, a yellow filter mounted on said camera for movement into and out of alignment with said lens, and means on said lens carrying member and filter for automatically positioning said filter in alignment with said lens when the latter is focused on distant objects and for moving said filter out of alignment with said lens when the latter is focused on near objects.

LEW W. LESSLER.
BROR W. HENRIKSON.